United States Patent
Bouazizi et al.

(10) Patent No.: US 10,917,477 B2
(45) Date of Patent: Feb. 9, 2021

(54) METHOD AND APPARATUS FOR MMT INTEGRATION IN CDN

(71) Applicant: Samsung Electronics Co., Ltd, Suwon-si (KR)

(72) Inventors: Imed Bouazizi, Plano, TX (US); Kyungmo Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 531 days.

(21) Appl. No.: 15/603,244

(22) Filed: May 23, 2017

(65) Prior Publication Data

US 2017/0346906 A1 Nov. 30, 2017

Related U.S. Application Data

(60) Provisional application No. 62/341,340, filed on May 25, 2016, provisional application No. 62/343,982, filed on Jun. 1, 2016.

(51) Int. Cl.
*H04L 29/08* (2006.01)
*H04L 29/06* (2006.01)

(52) U.S. Cl.
CPC ........ *H04L 67/148* (2013.01); *H04L 65/1069* (2013.01); *H04L 65/1083* (2013.01); *H04L 65/4084* (2013.01); *H04L 65/4092* (2013.01); *H04L 67/02* (2013.01); *H04L 69/18* (2013.01)

(58) Field of Classification Search
None
See application file for complete search history.

(56) References Cited

U.S. PATENT DOCUMENTS

| 2011/0116772 A1 | 5/2011 | Kwon et al. |
| 2011/0125919 A1 | 5/2011 | Kwon et al. |
| 2014/0020111 A1 | 1/2014 | Wang et al. |

(Continued)

FOREIGN PATENT DOCUMENTS

| CN | 102812666 A | 12/2012 |
| CN | 104350760 A | 2/2015 |

(Continued)

OTHER PUBLICATIONS

D. Dorwin et al. "Encrypted Media Extensions W3C Proposed Recommendation"; http://www.w3.org/TR/encrypted-media/[May 22, 2017 2:42:03 PM]; Mar. 6, 2017—90 Pages.

(Continued)

*Primary Examiner* — Tonia L Dollinger
*Assistant Examiner* — Ishrat Rashid

(57) ABSTRACT

A user equipment (UE) includes a communication unit and a processor. The communication unit communicates with a server. The processor transmits a hypertext transfer protocol (HTTP) streaming session request including an indication that the UE supports Motion Picture Experts Group (MPEG) media transport (MMT) to the server and receives a description of MMT service components including an indication that the server supports MMT. The processor also migrates the UE to a MMT streaming session, selects at least one service component from the MMT service components, transmits a selection message to the server, and receives media corresponding to the selected at least one service component.

20 Claims, 9 Drawing Sheets

(56) References Cited

U.S. PATENT DOCUMENTS

| | | |
|---|---|---|
| 2014/0314080 A1 | 10/2014 | Park et al. |
| 2014/0334504 A1 | 11/2014 | Yie et al. |
| 2015/0100996 A1 | 4/2015 | Freeman et al. |
| 2015/0113577 A1 | 4/2015 | Yie et al. |
| 2015/0150055 A1* | 5/2015 | Hwang .............. H04N 21/2362 725/54 |
| 2015/0195327 A1 | 7/2015 | Bouazizi et al. |
| 2016/0373498 A1* | 12/2016 | Mandyam ........... H04L 65/4015 |
| 2017/0013026 A1 | 1/2017 | Kwak et al. |
| 2017/0142236 A1 | 5/2017 | Park et al. |
| 2018/0006749 A1* | 1/2018 | Oh ....................... H04L 69/324 |
| 2018/0234712 A1 | 8/2018 | Chen et al. |

FOREIGN PATENT DOCUMENTS

| | | | |
|---|---|---|---|
| CN | 104471913 | A | 3/2015 |
| CN | 105308916 | A | 2/2016 |
| CN | 105491394 | A | 4/2016 |
| EP | 2784954 | A1 | 10/2014 |
| KR | 10-2011-0053180 | A | 5/2011 |
| KR | 10-2011-0105710 | A | 9/2011 |
| KR | 20130119887 | A * | 11/2013 |
| WO | 2013077697 | A1 | 5/2013 |
| WO | 2016003247 | A1 | 1/2016 |
| WO | 2016076623 | A1 | 5/2016 |

OTHER PUBLICATIONS

K. Park et al. "Text of ISO/IEC 2nd CD 23008-1 MPEG Media Transport"; International Organization for Standardization Organisation Internationale De Normalisation ISO/IEC JTC1/SC29/WG11 Coding of Moving Pictures and Audio ISO/IEC JTC1/SC29/WG11 MPEG/N13293 Geneva, Switzerland, Jan. 2013—152 Pages.

D. Jackson et al., "WebGL Specification" Khronos Group; Editor's Draft Wed May 10 17:39:30 2017-0400; WebGL Specification. htm[May 22, 2017 2:40:29 PM]—51 Pages.

International Search Report and Written Opinion for International Application No. PCT/KR2017/005472, dated Aug. 30, 2017. (10 pages).

Notification of the First Office Action in connection with Chinese Application No. CN201780032031I dated Aug. 25, 2020, 18 pages.

\* cited by examiner

| Syntax | Values | No. of bits | Mnemonic |
|---|---|---|---|
| Mapping_message () { | | | |
|    message_id | | 16 | |
|    Version | | 8 | |
|    Length | | 16 | |
|    time_period_count | N1 | 16 | |
|    for (i=0; i<N1;i++) { | | | |
|      start_time | | 64 | |
|      service_component_count | N2 | 16 | |
|      for (j=0; j<N2; j++) { | | | |
|         alternative_asset_count | N3 | 8 | |
|         for (k=0 ; k<N3;k++) { | | | |
|            packet_id | | 16 | |
|            bandwidth_requirement | | 32 | |
|            mime_type() | | | |
|         } | | | |
|      } | | | |
|    } | | | |
| } | | | |

FIGURE 7

| Syntax | Values | No. of bits | Mnemonic |
|---|---|---|---|
| Content_Selection_message () { | | | |
|    message_id | | 16 | |
|    Version | | 8 | |
|    Length | | 16 | |
|    start_time | | 64 | |
|    MMTP_subflow_count | N1 | 8 | |
|    for (i=0; i<N1;i++) { | | | |
|      packet_id | | 16 | |
|    } | | | |
| } | | | |

FIGURE 8

METHOD AND APPARATUS FOR MMT INTEGRATION IN CDN

CROSS-REFERENCE TO RELATED APPLICATION AND CLAIM OF PRIORITY

This application claims priority under 35 U.S.C. § 119(e) to U.S. Provisional Patent Application No. 62/341,340 filed on May 25, 2016 and U.S. Provisional Patent Application No. 62/343,982 filed on Jun. 1, 2016. The above-identified provisional patent applications are hereby incorporated by reference in its entirety.

TECHNICAL FIELD

This disclosure relates generally to media presentations. More specifically, this disclosure relates to a method and apparatus for converting streaming content in a content distribution network into a MPEG media transport streaming session.

BACKGROUND

Media delivery over the Internet today relies heavily on hypertext transfer protocol (HTTP) because HTTP is easy to pass through network address translations (NATs) and firewalls, HTTP streaming does not require special hardware or software and can be served by any HTTP server, and HTTP streaming can be distributed through existing Content Distribution Networks (CDNs)

However, HTTP-streaming suffers from delay and synchronization issues due to the nature of the protocols that are used. HTTP is designed for delivering files and TCP is designed for reliable data delivery. Both protocols are not suitable for low-delay delivery of media as TCP suffers from bitrate fluctuation and the reliability offered is not always required for streaming.

In some instances, the HTTP stream may contain encrypted virtual reality (VR) content. In order to generate VR content, a real-world environment has to be captured in all directions resulting in an omnidirectional video corresponding to a viewing sphere. Head-Mounted Displays (HMDs) have the ability to track head motion with low latency and adjust the viewport, i.e. the region the user currently sees, to the direction the user is facing. Stereoscopic VR also presents a separate view to each eye to trigger depth perception. Video coding standards are not designed to compress spherical video. A spherical video has to be projected or mapped to one or more rectangular planes for compression and delivery. These projections need to be performed after decoding and decryption of the content, which will require the VR renderer to have access to the unencrypted media data. However, access to the uncompressed, unencrypted media data is usually prohibited to ensure that content is not copied illegally.

SUMMARY

This disclosure provides a method and apparatus for converting HTTP streaming sessions into MMT streaming sessions.

In a first embodiment, a user equipment (UE) includes a communication unit and a processor. The communication unit communicates with a server. The processor transmits a hypertext transfer protocol (HTTP) streaming session request including an indication that the UE supports Motion Picture Experts Group (MPEG) media transport (MMT) to the server and receives a description of MMT service components including an indication that the server supports MMT. The processor also migrates the UE to a MMT streaming session, selects at least one service component from the MMT service components, transmits a selection message to the server, and receives media corresponding to the selected at least one service component.

In a second embodiment, a method for reproducing media received from a server on a user equipment (UE) includes transmitting a hypertext transfer protocol (HTTP) streaming session request including an indication that the UE supports Motion Picture Experts Group (MPEG) media transport (MMT) to the server and receiving a description of MMT service components including an indication that the server supports MMT. The method also includes migrating the UE to a MMT streaming session, selecting at least one service component from the MMT service components, transmitting a selection message to the server, and receiving media corresponding to the selected at least one service component.

In a third embodiment, a server includes a communication unit and a processor. The communication unit communicates with a user equipment (UE). The processor receives a hypertext transfer protocol (HTTP) streaming session request from the UE and translates content corresponding to the HTTP streaming session request into a Motion Picture Experts Group (MPEG) media transport (MMT) streaming session by generating MMT service components from an HTTP manifest. The processor also transmits a description of the MMT service components to the UE, receives a selection message from the UE including at least one service component from the MMT service components, and transmits media corresponding to the at least one service component to the UE.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure, reference is now made to the following description, taken in conjunction with the accompanying drawings, in which:

FIG. 7 illustrates an example syntax of a MMT mapping message according to this disclosure;

FIG. 8 illustrates an example content selection message according to this disclosure;

DETAILED DESCRIPTION

FIGS. 1 through 10, discussed below, and the various embodiments used to describe the principles of the present invention in this patent document are by way of illustration only and should not be construed in any way to limit the scope of the disclosure. Those skilled in the art will understand that the principles of this disclosure may be implemented in any suitably arranged device or system.

Figure 1:
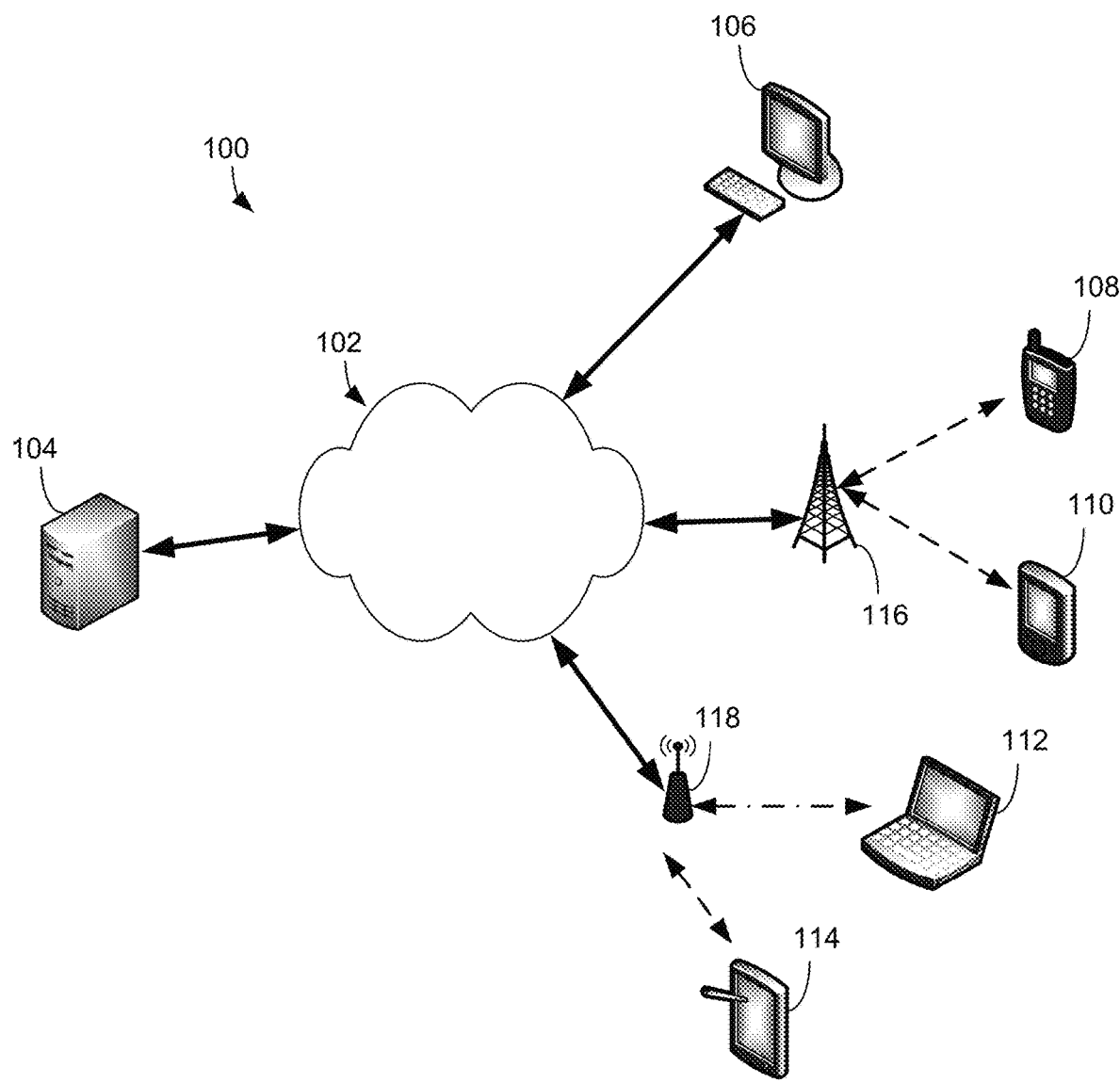
FIG. 1 illustrates an example computing system according to this disclosure.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, Asynchronous Transfer Mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one server 104 and various client devices 106-114. Server 104 includes any suitable computing or processing device that can provide computing services for one or more client devices. Server 104 could, for example, include one or more processing devices, one or more memories storing instructions and data, and one or more network interfaces facilitating communication over the network 102.

As will be discussed below, the at least one server 104 is part of a content distribution network (CDN) capable of providing content to one or more of the client devices 106-114. The content may be provided in a hypertext transfer protocol (HTTP) streaming session or a Motion Picture Experts Group (MPEG) Media Transport (MMT) session.

Each client device 106-114 represents any suitable computing or processing device that interacts with at least one server or other computing device(s) over the network 102. In this example, the client devices 106-114 include a desktop computer 106, a mobile telephone or smartphone 108, a personal digital assistant (PDA) 110, a laptop computer 112, and a tablet computer 114. However, any other or additional client devices could be used in the computing system 100.

In this example, some client devices 108-114 communicate indirectly with the network 102. For example, the client devices 108-110 communicate via one or more base stations 116, such as cellular base stations or eNodeBs. Also, the client devices 112-114 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

As described in more detail below, the client devices 106-114 may be used to access content on the server 104.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
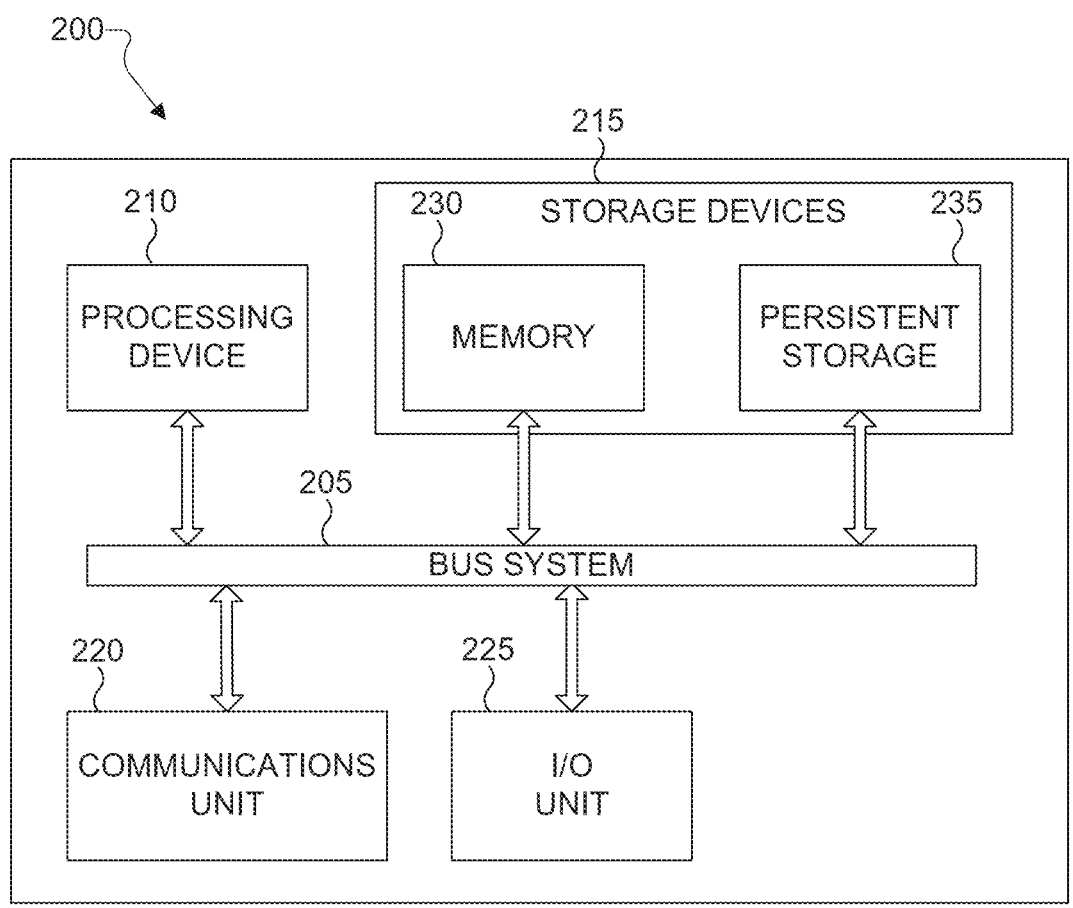
FIGS. 2 and 3 illustrate example devices in a computing system according to this disclosure.
Figure 3:
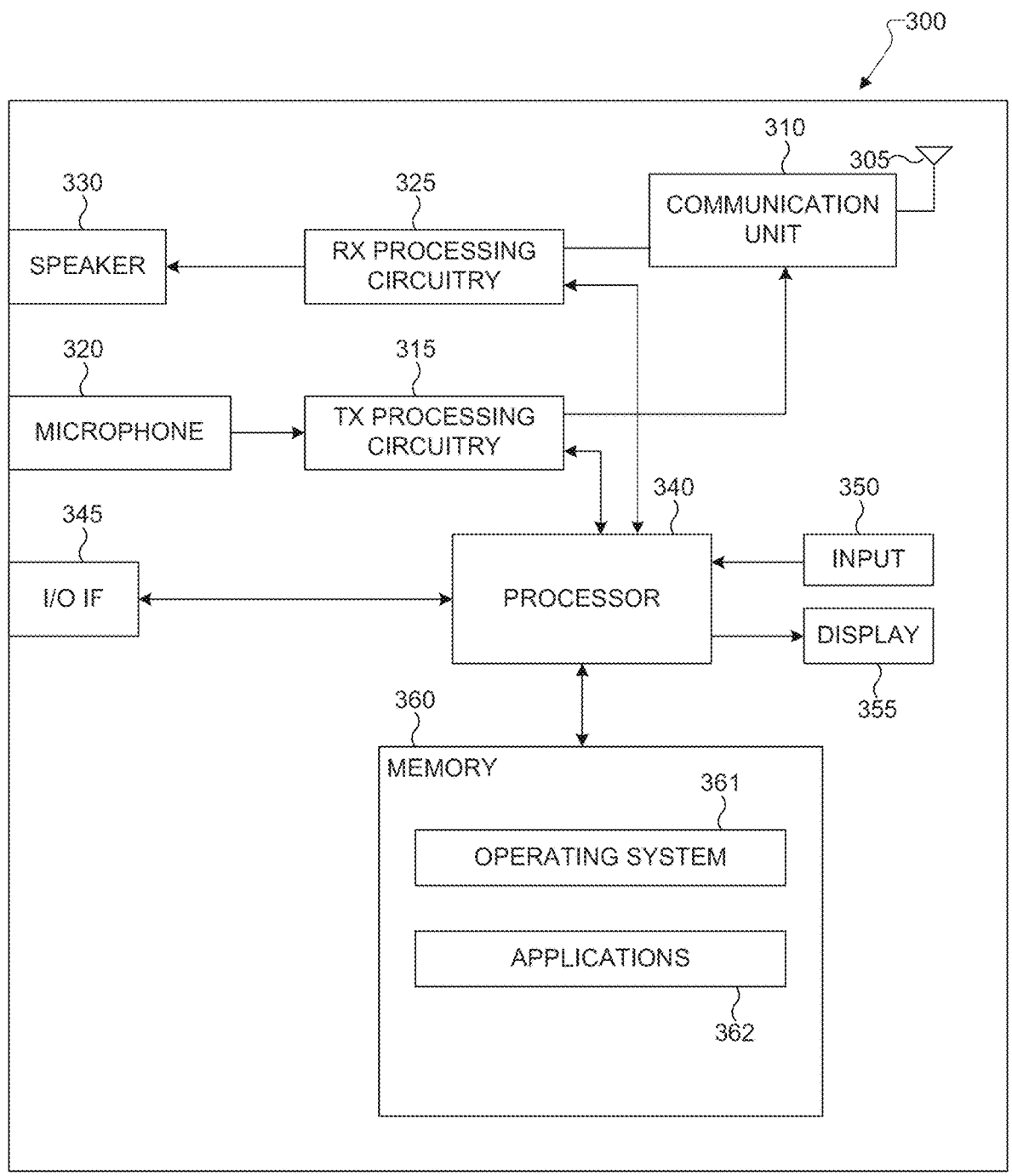

FIGS. 2 and 3 illustrate example devices in a computing system according to this disclosure. In particular, FIG. 2 illustrates an example server 200, and FIG. 3 illustrates an example client device 300. The server 200 could represent the server 104 in FIG. 1, and the client device 300 could represent one or more of the client devices 106-114 in FIG. 1.

As shown in FIG. 2, the server 200 includes a bus system 205, which supports communication between at least one processing device 210, at least one storage device 215, at least one communications unit 220, and at least one input/output (I/O) unit 225.

The processing device 210 executes instructions that may be loaded into a memory 230. The processing device 210 may include any suitable number(s) and type(s) of processors or other devices in any suitable arrangement. Example types of processing devices 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

Note that while FIG. 2 is described as representing the server 104 of FIG. 1, the same or similar structure could be used in one or more of the client devices 106-114. For example, a laptop or desktop computer could have the same or similar structure as that shown in FIG. 2.

As shown in FIG. 3, the client device 300 includes an antenna 305, a communication unit 310, transmit (TX) processing circuitry 315, a microphone 320, and receive (RX) processing circuitry 325. The client device 300 also includes a speaker 330, a processor 340, an input/output (I/0) interface (IF) 345, an input 350, a display 355, and a memory 360. The memory 360 includes an operating system (OS) program 361 and one or more applications 362.

The communication unit 310 receives, from the antenna 305, an incoming RF signal transmitted by another component in a system. The communication unit 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The communication unit 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS program 361 stored in the memory 360 in order to control the overall operation of the client device 300. For example, the processor 340 could control the reception of forward channel signals and the transmission of reverse channel signals by the communication unit 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS program 361 or in response to signals received from external devices or an operator. The processor 340 is also coupled to the I/O interface 345, which provides the client device 300 with the ability to connect to other devices such as laptop computers and handheld computers. The I/O interface 345 is the communication path between these accessories and the processor 340.

The processor 340 is also coupled to the input 350 and the display 355. The operator of the client device 300 can use the input 350 to enter data into the client device 300. For example, the input 350 may be a touchscreen, button, and/or keypad. The display 355 may be a liquid crystal display or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

As described in more detail below, the client device 300 may receive presentation information, such as an HTML5 document and one or more CI documents from server 105 to reproduce a presentation.

Although FIGS. 2 and 3 illustrate examples of devices in a computing system, various changes may be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the client device 300 configured as a mobile telephone or smartphone, client devices could be configured to operate as other types of mobile or stationary devices. In addition, as with computing and communication networks, client devices and servers can come in a wide variety of configurations, and FIGS. 2 and 3 do not limit this disclosure to any particular client device or server.

Figure 4:
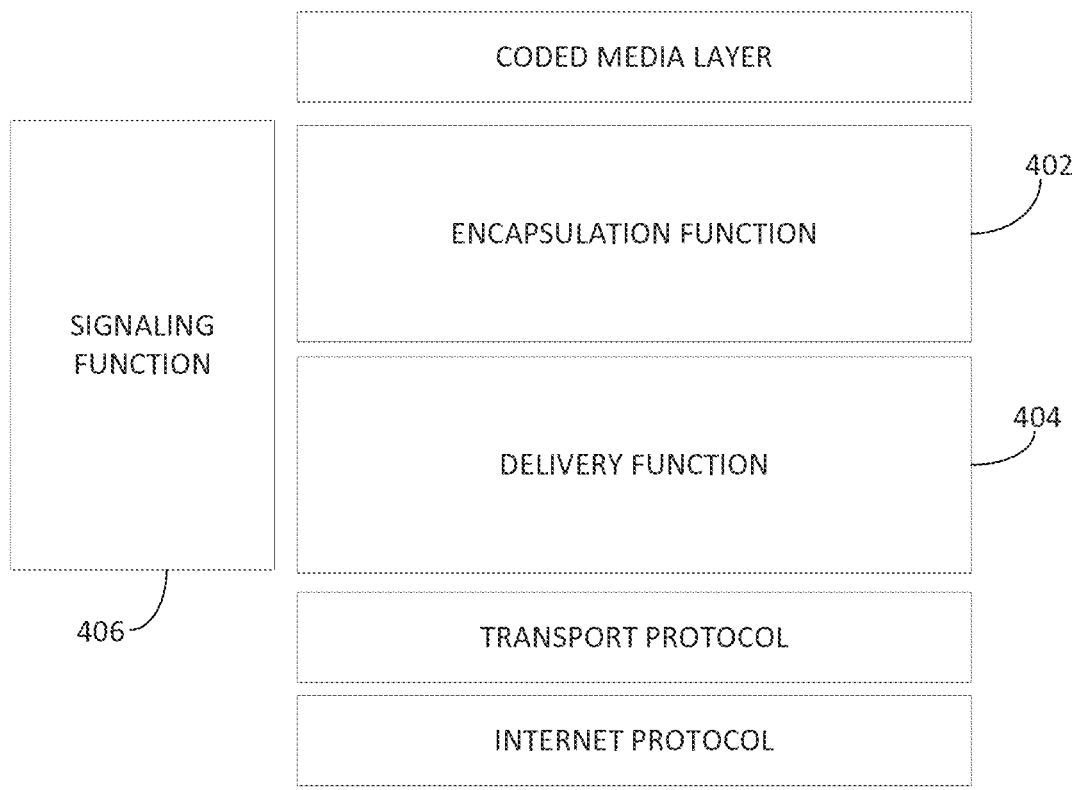
FIG. 4 illustrates an example functional area of an MPEG media transport (MMT) according to this disclosure.

FIG. 4 illustrates an example functional area of an MPEG media transport (MMT) according to this disclosure. MMT offers an IP-based solution that contains a MPEG media transport protocol (MMTP), a signaling framework, and a forward error connection (FEC) framework that are well suited for the delivery of timed and non-timed media data. MMT offers simple multiplexing of multiple media services into a single MMTP flow as well as the simple extraction of media services and media components. Each media component is identified by a unique packet id that sets the scope for the packet sequence number space. Extracting or adding a new component does not require re-processing the MMTP flow. MMT also offers low delay delivery compared to other media delivery solutions optimizing the transport for the media container.

As shown in FIG. 4, the functional are of the MMT includes an encapsulation function 402, a delivery function 404, and a signaling function 406. The encapsulation function defines the logical structure of the media content, MMT package, and the format of the data units to be processed by the MMT compliant entity. The MMT package includes the components comprising media content and the description of relationship among them to provide necessary information to the underlying delivery layer for adaptive operation. The format of the data units is defined to encapsulate the coded media either to be stored or to be carried as a payload of a delivery protocol and to be easily converted between them.

The delivery function 404 defines application layer protocol and format of payload. The application layer protocol provides enhanced features for delivery of coded media data compared to conventional application layer protocols for the delivery of multimedia, including multiplexing. The payload format is defined to carry coded media data agnostic to the specific media type or encoding method.

The signaling function 406 defines the format of messages to manage delivery and consumption of MMT packages. Messages for consumption management are used to signal the structure of MMT package and messages for delivery management are used signal the structure of payload format and configuration of the protocol.

Figure 5:
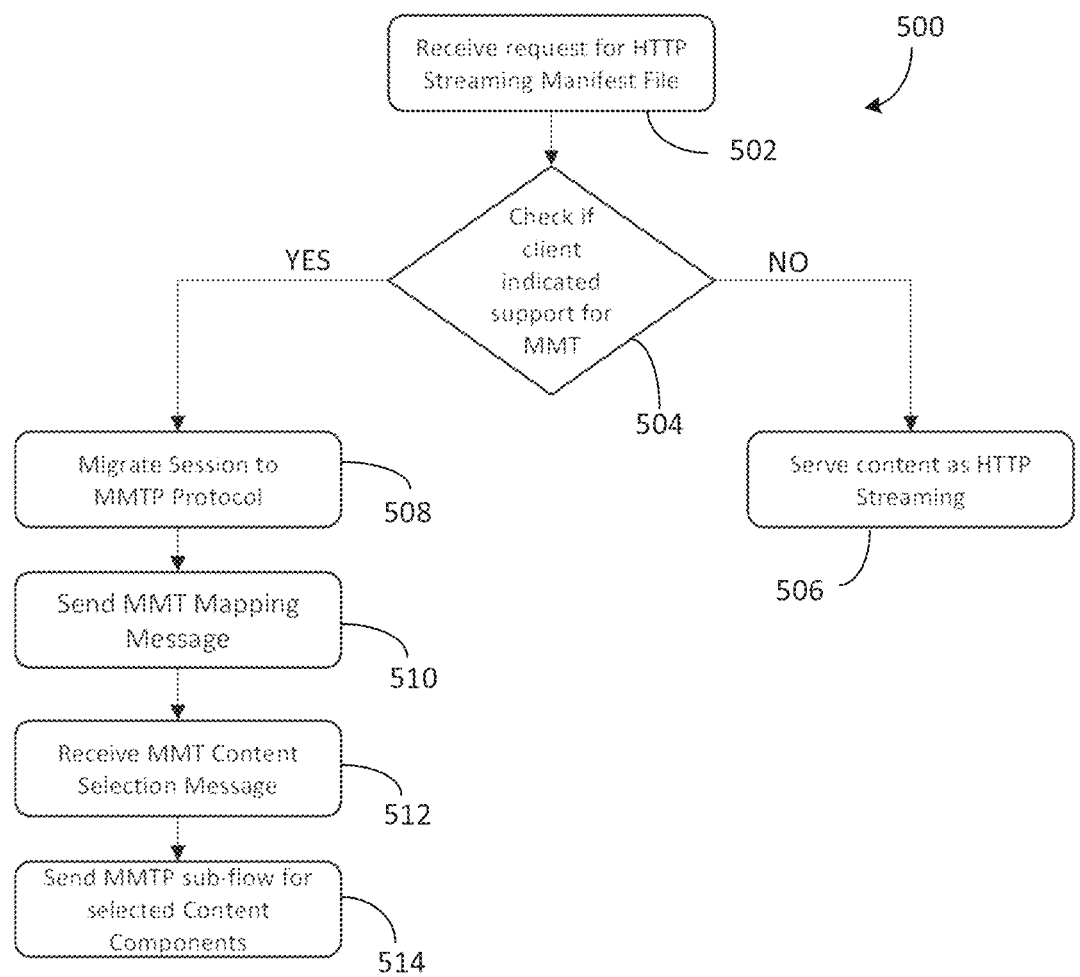
FIG. 5 illustrates an example method for converting a streaming session according to this disclosure

FIG. 5 illustrates an example method 500 for converting a streaming session according to this disclosure. FIG. 5 will be discussed while making reference to server 200 of FIG. 2 and client device 300 of FIG. 3.

As shown in FIG. 5, in operation 502, a server 200 receives a request for a hypertext transfer protocol (HTTP) streaming manifest file from the client device 300. The server 200 determines whether the client device 300 can support MMT (504). If the client device 300 does not support MMT, the content is provided from server 200 to client device 300 as an HTTP streaming session (506).

If the client device 300 supports MMT, method 500 proceeds to operation 508 where the HTTP session is migrated to the MMTP session. In an embodiment, the MMTP session is performed over WebSockets. After a successful migration to MMTP, the server 200 will send an MMT mapping message that provides the mapping between the representations that are described in the manifest of the HTTP streaming session and the corresponding MMTP sub-flows (510). Client device 300 may then select a subset of the representations to receive as well as the starting time on the media timeline to start playback and provide the selections to server 200 (512). The server 200 will then convert the streaming segments of the selected representations into an MMTP flow and will signal the boundaries and characteristics of the streaming segments for easy reconstruction of the session at the client device 300 to ensure that MMT remains fully compatible with the HTTP streaming session (514).

Figure 6:
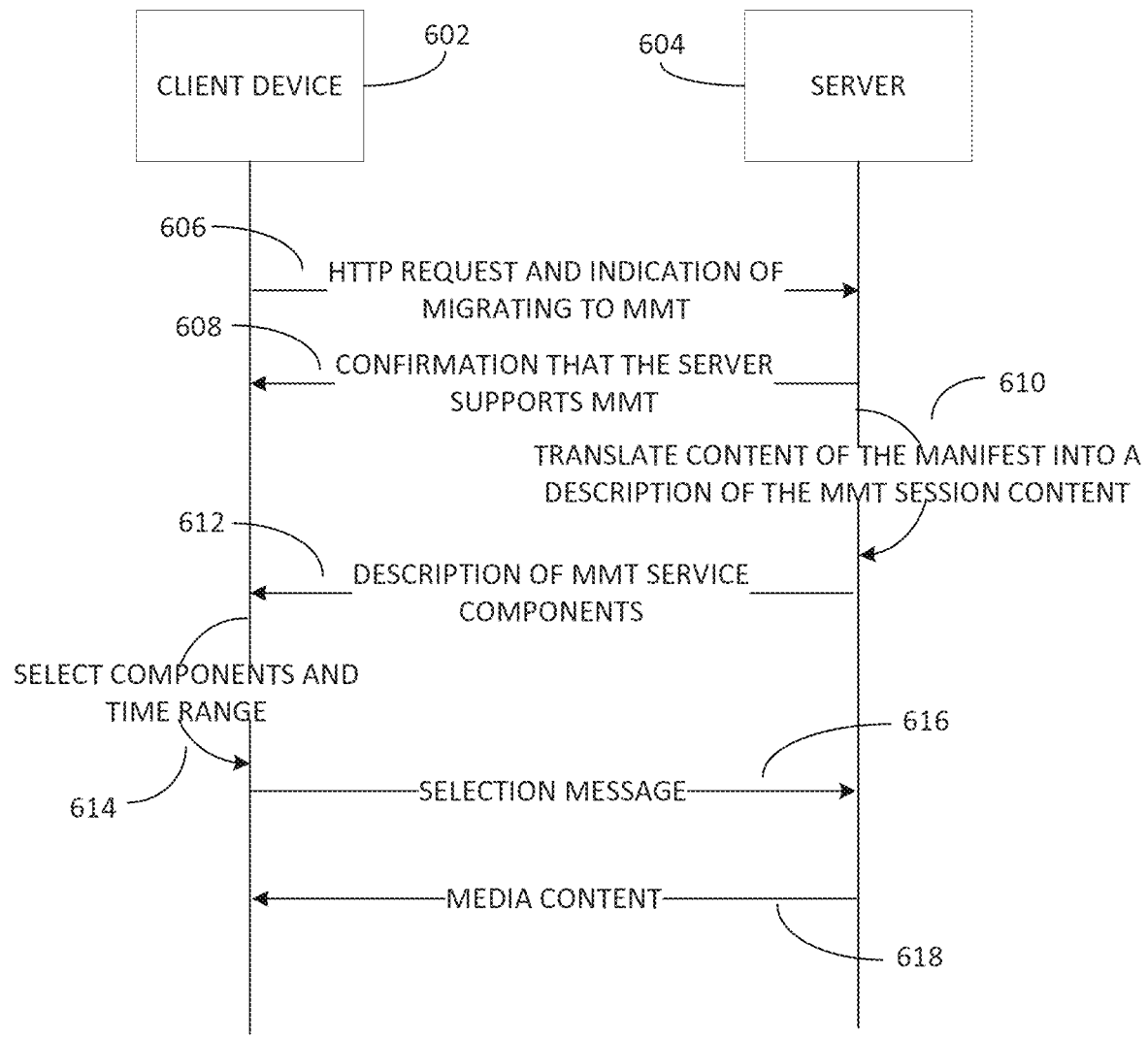
FIG. 6 illustrates an example signal flow diagram for converting a streaming session according to this disclosure.

FIG. 6 illustrates an example signal flow between client device 602 and server 604 for converting a streaming session according to this disclosure. Client device 602 may represent client device 300 of FIG. 3 and server 604 may represent server 200 of FIG. 2. As shown in FIG. 6, the client device 602 sends an HTTP session request that may include an indication that the client device 602 is capable of supporting MMT (606). The client device 602 receives a confirmation that the server 604 also supports MMT (608).

The server 604 translates the content of a HTTP manifest into a description of the MMT session content (610) and transmits a description of the MMT service components in the MMT session content to client device 602 as an MMT mapping message (612). The client device 602 receives the description of the MMT service components and selects the components that it wants to stream and indicates the time range (614). The client device 602 then transmits a selection message (616) and starts streaming the selected service components for the selected time range (618). The selected service components are displayed by the client device FIG. 7 illustrates an example syntax of a MMT mapping message according to this disclosure. As shown in FIG. 7, the MMT mapping message includes a message id that indicates the identification of the mapping message. The version indicates the version of the mapping message and the length indicates the length of the mapping message in bytes, counting from the beginning of the next field to the last byte of the mapping message. The time period count indicates the number of presentations that will be served as part of this session. The list of presentations may be updated dynamically in the case of live sessions. The service component count indicates the number of selection sets in the current presentation. The alternative_asset_count switching indicates the number of switching sets in the current selection set. The packet_id identifies the MMTP sub-flow that carries the representations and the bandwidth_requirement provides the bandwidth requirement of the current representations. The mime type is used to describe the MIME type of the current switching set. If the encodings of the representations within the switching set differ, the MIME type of the track with the highest codec requirements shall be signaled.

FIG. 8 illustrates an example content selection message according to this disclosure. As shown in FIG. 8, the content selection message includes a message_id that indicates the identification of the content selection message. The version indicates the version of the content selection message and the length indicates the length of the content selection message in bytes, counting from the beginning of the next field to the last byte of the content selection message. The start_time is the presentation start time at which the MMT receiving entity requests the sending entity to start delivering and the subflow count indicates the number of MMTP sub-flows that the MMT receiving entity (client device 300) is requesting in this selection message. The packet_id provides the packet_id that the MMTP receiving entity is requesting.

Figure 9:
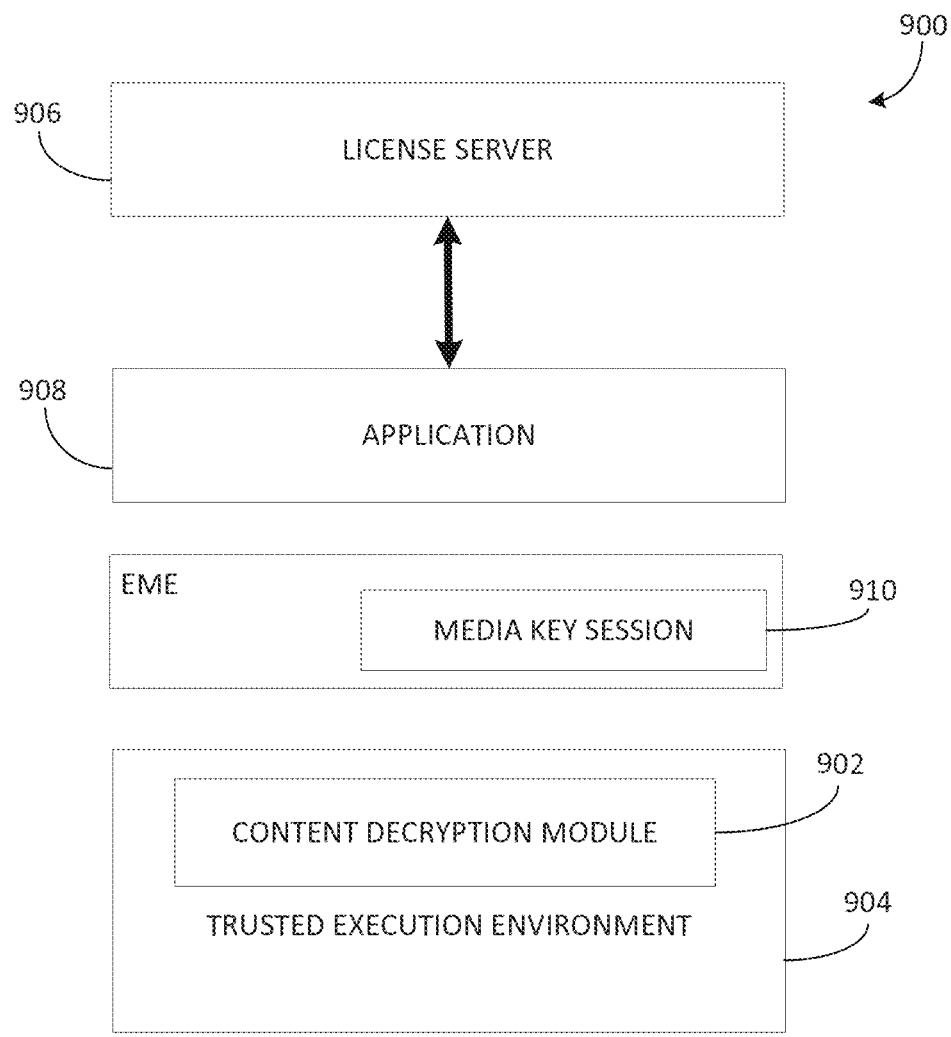
FIG. 9 illustrates an example architecture of an encrypted media extension according to this disclosure.

In some embodiments, the representations may be encrypted. FIG. 9 illustrates an example architecture of an encrypted media extension (EME) 900 according to this disclosure. An EME provides an application program interface (API) that enables applications to interact with content protection systems to allow playback of encrypted audio and video. As shown in FIG. 9, the EME 900 includes a content decryption module (CDM) 902 that performs the content decryption for a client device. It runs in a trusted environment 904 and passes the decrypted frames to a secure decoder. EME was developed as a set of extensions to media source extensions and is invoked when regular playback detects that the media is encrypted. After retrieving a license from a license server 906, the application 908 updates a MediaKeySession object 910 with the license data that contains one or more keys and their corresponding key IDs.

For example, in an embodiment, the application 908 attempts to play media that has one or more encrypted streams. A user agent (not shown) recognizes that the media is encrypted and sends an encrypted event with metadata obtained from the media about the encryption to the application 908. If no MediaKeys object has been associated with the media element, the application 908 selects an available Key System by using navigator.requestMediaKeySystemAccess( ) to check what Key Systems are available and then creates a MediaKeys object for an available Key System via a MediaKeySystemAccess object. The application 908 will independently get a URL for the license server 906. The MediaKeys object represents all the keys available to decrypt the media for an audio or video element. The MediaKeys object also represents a CDM instance and provides access to the CDM 902, specifically for creating key sessions, which are used to obtain keys from a license server. Once the MediaKeys object has been created, the application 908 will assign it to the media element using the setMediaKeys( ) which associates the MediaKeys object with an HTMLMediaElement, so that its keys can be used for decryption of the content.

The application 908 creates a MediaKeySession by calling createSession( ) on the MediaKeys. This creates a MediaKeySession object 910, which represents the lifetime of a license and its key(s). The application 908 also generates a license request by passing the media data obtained in the encrypted handler to the CDM 902, by calling generateRequest( ) on the MediaKeySession. The CDM 902 sends an event that indicates a request to acquire a key from a license server. The MediaKeySession object 910 receives the message event and the application 908 sends a message to the license server 906 to acquire a license with the required keys. The application 908 receives a response from the license server 906 and passes the data to the CDM 902 using the update( )method of the MediaKeySession. The CDM 902 decrypts the media using the keys in the license. A valid key may be used, from any session within the MediaKeys associated with the media element. The CDM 902 will access the key and policy, indexed by Key ID.

Figure 10:
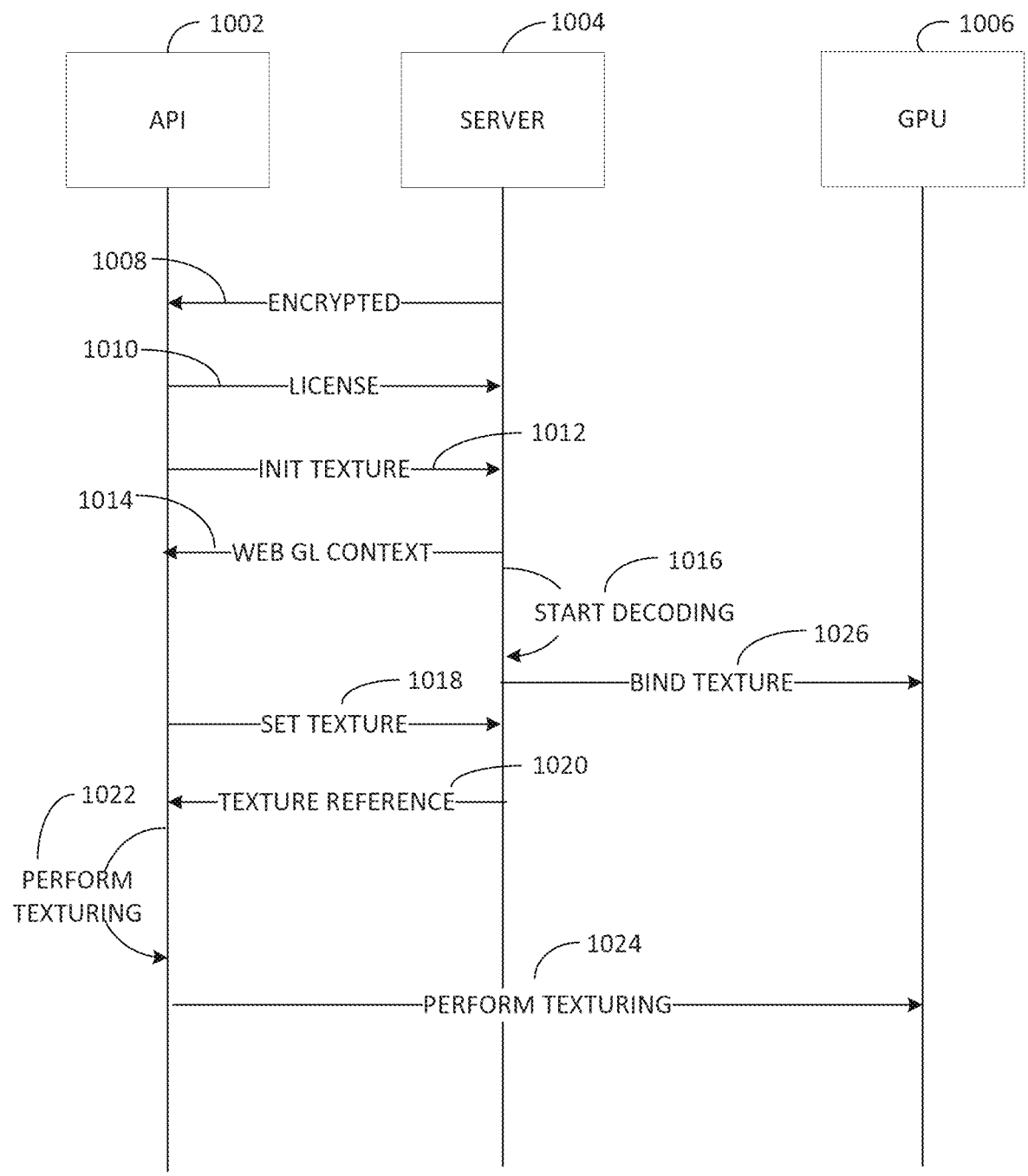
FIG. 10 illustrates an example signal flow diagram according to this disclosure.

FIG. 10 illustrates an example signal flow diagram for decrypting content in EME architecture according to this disclosure. As shown in FIG. 10, a message is transmitted to API 1002 that indicates that the content is encrypted (1008). The API acquires a license and passes it to the CDM 1004 (1010). The API 1002 also provides an initial texture to the CDM 1004 (1012). The CDM then calls the API function (1014) to initialize a graphics library (GL), such as OpenGL or WebGL, for rendering media, such as VR video. The CDM 1004 then decodes each video frame (1016). For each decoded video frame, the CDM 1004 calls the API function 1002 in the CDM 1004 to set the global texture (1018) to the most current video frame and provides a texturing reference (1020). The API 1002 performs the texturing operation based on VR geometry and texture mapping/projection format and using the bound texture from a previous operation (1022). After texture mapping of that frame, the CDM 1004 calls the API 1002 to release and dispose of the texture. The performed texture is provided to the GPU 1006 (1024).

In one embodiment, the initialization of the OpenGL environment would initialize the OpenGL context and allocate an HTML Canvas that will securely present the content. In another embodiment, this function call will return a WebGL context reference to be used to do the rendering.

In yet another embodiment, the API call to set the texture may bind the texture to the allocated WebGL context, for example by calling the bindTexture and then subsequently load the current frame into the GPU 1006 as part of that texture using the tex2DImage WebGL function (1026).

In another embodiment, the API call to release the texture may result in a call to the WebGL bindTexture function with a null or potentially with another texture reference. A call to deleteTexture may also be made.

In another embodiment, the CDM 1004 may be informed about required WebGL rendering during the encryption key acquisition procedure.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A user equipment (UE) comprising:
   a communication unit configured to communicate with a server; and
   a processor coupled to the communication unit, the processor is configured to:
      transmit a hypertext transfer protocol (HTTP) streaming session request including an indication that the UE supports Motion Picture Experts Group (MPEG) media transport (MMT) to the server;
      receive a first message indicating that the server supports MMT;
      after the first message is received, migrate from an HTTP session to a MMT streaming session;
      after the HTTP session is migrated to the MMT streaming session, receive a second message including a description of MMT service components;
      select at least one service component from the MMT service components;
      transmit a selection message, indicating the selected at least one service component, to the server; and
      receive media corresponding to the selected at least one service component.

2. The UE of claim 1, wherein the selection message includes a start time for the selected at least one service component.

3. The UE of claim 1, wherein the description of the MMT service components includes an MMT mapping message.

4. The UE of claim 3, wherein the MMT mapping message includes at least one of a time_period_count, start time, service_component_count, or alternative_asset count.

5. The UE of claim 1, wherein the selection message includes an MMT protocol (MMTP)_subflow_count.

6. The UE of claim 1, wherein the processor is configured to select a time range for the selected at least one service component.

7. The UE of claim 1, further comprising a display configured to display the media corresponding the selected at least one service component.

8. A method for reproducing media received from a server on a user equipment (UE), the method comprising:

transmitting a hypertext transfer protocol (HTTP) streaming session request including an indication that the UE supports Motion Picture Experts Group (MPEG) media transport (MMT) to the server;
receiving a first message indicating that the server supports MMT;
after the first message is received, migrating from an HTTP session to a MMT streaming session;
after the HTTP session is migrated to the MMT streaming session, receive a second message including a description of MMT service components;
selecting at least one service component from the MMT service components;
transmitting a selection message, indicating the selected at least one service component, to the server; and
receiving media corresponding to the selected at least one service component.

9. The method of claim 8, wherein the selection message includes a start time for the selected at least one service component.

10. The method of claim 8, wherein the description of the MMT service components includes an MMT mapping message.

11. The method of claim 10, wherein the MMT mapping message includes at least one of a time_period_count, start time, service_component_count, or alternative_asset count.

12. The method of claim 8, wherein the selection message includes an MMT protocol (MMTP)_subflow_count.

13. The method of claim 8, further comprising selecting a time range for the selected at least one service component.

14. The method of claim 8, further comprising a displaying the media corresponding the selected at least one service component.

15. A server comprising:
a communication unit configured to communicate with a user equipment (UE); and
a processor coupled to the communication unit, the processor is configured to:
receive a hypertext transfer protocol (HTTP) streaming session request from the UE, the HTTP streaming session request including an indication that the UE supports Motion Picture Experts Group (MPEG) media transport (MMT);
transmit a message indicating that the server supports MMT;
translate content corresponding to the HTTP streaming session request into a MMT streaming session by generating MMT service components from an HTTP manifest;
after the UE migrated from an HTTP session to the MMT streaming session, transmit a description of the MMT service components to the UE;
receive a selection message from the UE including at least one service component from the MMT service components; and
transmit media corresponding to the at least one service component to the UE.

16. The server of claim 15, wherein the selection message includes a start time for the at least one service component.

17. The server of claim 15, wherein the description of the MMT service components includes an MMT mapping message.

18. The server of claim 17, wherein the MMT mapping message includes at least one of a time_period_count, start time, service_component_count, or alternative_asset count.

19. The server of claim 15, wherein the selection message includes an MMT protocol (MMTP)_subflow_count.

20. The server of claim 15, wherein when the HTTP streaming session request does not include an indication that the UE supports MMT, the server transmits the media using HTTP.

* * * * *